United States Patent [19]
Straub et al.

[11] Patent Number: 5,931,006
[45] Date of Patent: Aug. 3, 1999

[54] VEHICLE AIR CONDITIONING UNIT WITH AN AIR-CONDITIONING FUNCTION DEPENDING ON THE EXTERNAL DEW POINT

[75] Inventors: Wolfgang Straub, Deggingen; Herbert Wieszt, Grafenau, both of Germany

[73] Assignee: Daimler-Benz Aktiengesellschaft, Stuttgart, Germany

[21] Appl. No.: 09/110,247

[22] Filed: Jul. 6, 1998

[30] Foreign Application Priority Data

Jul. 4, 1997 [DE] Germany .......................... 197 28 579

[51] Int. Cl.$^6$ .................................................. F25D 17/06
[52] U.S. Cl. .................. 62/89; 62/176.6; 62/178; 62/186; 62/244; 236/49.3; 236/91 C
[58] Field of Search .......................... 62/151, 156, 176.2, 62/176.6, 178, 186, 244, 89; 236/49.1, 49.3, 49.4, 49.5, 91 C

[56] References Cited

U.S. PATENT DOCUMENTS

| | | | |
|---|---|---|---|
| 4,709,751 | 12/1987 | Ichimaru et al. ...................... | 62/244 X |
| 4,730,662 | 3/1988 | Kobayashi ............................. | 62/186 X |
| 4,852,363 | 8/1989 | Kampf et al. .......................... | 62/176.6 |
| 4,896,589 | 1/1990 | Takahashi ............................. | 62/176.6 X |
| 4,917,293 | 4/1990 | Fedter et al. ........................... | 236/49.3 |
| 4,920,755 | 5/1990 | Tadahiro ............................... | 62/176.6 X |
| 5,570,838 | 11/1996 | Davis, Jr. et al. ..................... | 236/49.3 |
| 5,701,752 | 12/1997 | Tsunokawa et al. ................... | 62/244 X |

FOREIGN PATENT DOCUMENTS 36 24 171  1/1988  Germany .

*Primary Examiner*—Henry Bennett
*Assistant Examiner*—Susanne C. Tinker
*Attorney, Agent, or Firm*—Evenson, McKeown, Edwards & Lenahan, P.L.L.C.

[57] ABSTRACT

An air-conditioning unit is provided for a vehicle with an air-conditioning function depending on the outside dew point. The air-conditioning unit includes a device for determining the dew point temperature of the outside air, an air duct leading to a window of the vehicle and having a controllable closing device, a device for determining the temperature of the air blown through the ducts leading to the window of the vehicle and a control device for automatically opening and closing the air duct leading to a window of the vehicle by appropriately energizing the air duct closing device. The control device, in the cooling operation of the air conditioning unit, opens and closes this air duct automatically as a function of the dew point temperature determined for the outside air and as a function of the temperature determined for the air blown out through this air duct. The air duct is kept closed by the control device as long as the temperature of the air blown out is lower than the dew point temperature of the outside air plus a specifiable safety offset temperature, and is otherwise kept open at least partially.

7 Claims, 1 Drawing Sheet

VEHICLE AIR CONDITIONING UNIT WITH AN AIR-CONDITIONING FUNCTION DEPENDING ON THE EXTERNAL DEW POINT

BACKGROUND AND SUMMARY OF THE INVENTION

This application claims the priority of German Patent Application No. 197 28 579.1, filed Jul. 4, 1997, the disclosure of which is expressly incorporated by reference herein.

The invention relates to a vehicle air conditioning unit having a device for determining the dew point temperature of the outside air, an air duct, leading to a window of the vehicle, with a controllable closing device, a device for determining the temperature of the air blown through the ducts leading to the window of the vehicle, and a control device for automatically opening and closing the air duct leading to the window of the vehicle by appropriately energizing the air duct closing device.

Such air conditioning units are known, it being possible, for example, for the air duct leading to a window of a vehicle, to be an air duct which leads to a windshield and ends at the windshield in a so-called defroster nozzle. The primary function of such a defroster air duct usually is to remove windshield icing as rapidly as possible in the winter and to prevent renewed icing during a continuous driving operation. For this purpose, heated air is directed particularly over the defroster nozzles to the inside of the windshield. Furthermore, the defroster air duct of conventional air conditioning units frequently is intended to remove condensation from the inside of the windshield or to prevent its formation. For this purpose, the air conditioning unit then has a so-called reheat mode of operation, in which the air, taken in by the air conditioning unit, is cooled at the evaporator and thereby dried, and then subsequently the dried air is heated and blown as a dry and sufficiently warm air stream through the defroster air duct against the inside of the windshield.

Furthermore, the interior of the vehicle is air conditioned by such air conditioning units as a function of the so-called dew point temperature of the outside air and, possibly, also of the inside air. The dew point temperature is defined as the temperature below which condensation occurs. For example, if the temperature of the windshield falls below the dew point temperature of the outside air or of the inside air, condensation is deposited on the outside or inside of the windshield. Means for determining the dew point temperature are known in various versions. For example, in an air conditioning unit of this type, which is described in the German Patent document DE 36 24 171 A1, the combination of a temperature sensor and a moisture sensor for determining the dew point temperature is known. The dew point temperature of the outside air as well as that of the inside air is determined in the above-reference. This information is used, on the one hand, for selectively influencing the inside climate and, on the other, for identifying a threatening or already existing formation of condensation on the inside of the windshield. One of the functions of an associated air conditioning control device is to decide, on the basis of the information supplied by the sensor, whether the interior of the vehicle is to be ventilated by way of an air duct directed at the windshield or by way of an air duct blowing more air into the central region of the interior.

The outside air taken in, which is cooled, for example, using an evaporator, is generally blown only over a portion of the existing air ducts into the interior by conventional air-conditioning units during the cooling operation, that is, during the operating phase for cooling the interior air. In particular, this is done by air conditioning units with automatic air guidance, that is, automatic division of the incoming air among the different air ducts present. During this time in particular, the defroster air duct generally remains closed in order to prevent the dangerous occurrence of condensation on the outside of the windshield by excessive cooling of the latter. In the case of air conditioning units with the possibility of automatically opening and closing the defroster air ducts, the changeover points are selected so that the windshield remains protected against condensation on the outside even during extremely moist and hot weather, during which there is the greatest tendency for condensation to form on the outside of the windshield. On the other hand, for the cooling operation, it is desirable that the incoming air is blown from as many air ducts as possible into the interior of the vehicle. After all, if fewer air ducts are open, the velocities of the blown air are greater and, as a result, there is a greater draft.

The invention is therefore based on the technical problem of making available a vehicle air-conditioning unit of the type described above, with which, on the one hand, condensation on the outside of the windshield during cooling operations is reliably prevented and, on the other hand, as far as possible draft-free ventilation of the interior is achieved.

Pursuant to the invention, this problem is solved by making available a vehicle air-conditioning unit wherein in the cooling operation of the air conditioning unit, the control device automatically opens and closes the air duct leading to the window of the vehicle as a function of the dew point temperature determined for the outside air and of the temperature determined for the air blown out through this air duct, the air duct being kept closed by the control device as long as the temperature of the air blown out is lower than the dew point temperature of the outside air plus a specifiable safety offset temperature, and kept open at least partially as long as the temperature of the air blown out lies above the dew point temperature of the outside air plus the specifiable offset temperature value.

With this unit, the air duct, leading to a glass pane of the vehicle, particularly to the windshield, is opened and closed during the cooling operation of the unit by the control device automatically as a function of the determined dew point temperature of the outside air and of the determined temperature of the air that is blown in this air duct in the direction of the window pane of the vehicle. Moreover, the control device keeps this air duct closed as long as the temperature of the blown air is lower than the sum of the dew point temperature of the outside air and a specifiable safety offset temperature. Depending on the particular case, the latter can be set at a desirable, suitable value greater than zero, in order to ensure that the air duct is closed in good time before condensation appears on the outside of the glass pane, when the temperature of the blown air approaches the dew point temperature of the outside air from above. Otherwise, the control device keeps the air duct in question at least partially open at all times, as long as the temperature of the air that is blown is higher than the sum of the dew point temperature of the outside air and the specifiable safety offset temperate.

All told, a cooling operation for which even the air duct leading to the window pane of the vehicle contributes in every situation towards achieving a ventilation of the interior with cooling air which is as draft-free as possible, and therefore a ventilation over as many as possible of the existing air ducts so long as this does not lead to condensation on the outside of the window pane, can consequently be realized with this air-conditioning unit. In particular, this air duct can be a defroster air duct. Compared to conventional air-conditioning units with a fixed changeover point between opening and closing the defroster air duct during the cooling operation, which changeover point depends on the most unfavorable case of extreme moist and hot weather, the air duct leading to the window pane of the vehicle can, in the case of the inventive air-conditioning unit, remain open longer during the cooling operation, for example, when the weather is less moist. This increases the comfort of the interior cooling for the passengers of the vehicle.

In the case of a preferred embodiment of the air-conditioning unit the air duct, leading to a window pane of the vehicle, can be adjusted within a temperature interval, the width of which can be specified and which adjoins the dew point temperate of the outside air plus the specifiable safety offset temperature, infinitely variably or in steps to intermediate positions between its completely open and its completely closed positions. With that, the air duct can still be used at least partly in this range for ventilating the interior with cool air, while at the same time its air throughput is limited so that the occurrence of condensation on the outside of the window panes is reliably prevented.

Other objects, advantages and novel features of the present invention will become apparent from the following detailed description of the invention when considered in conjunction with the accompanying drawings.

DETAILED DESCRIPTION OF THE DRAWINGS

Figure 1:
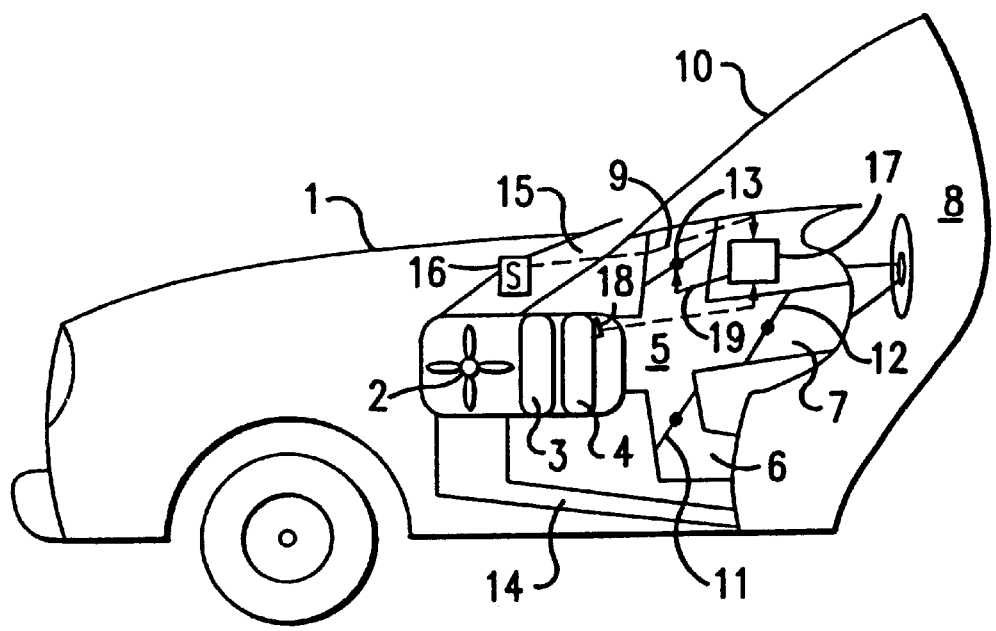
FIG. 1 shows a diagrammatic side view of a passenger car with an air conditioning unit, of which the action of the cooling air on the interior of the vehicle depends on the outside dew point.

FIG. 1 diagrammatically 1 shows the relevant components on hand in an air-conditioning unit installed in a passenger car 1. The air-conditioning unit has a conventional construction and comprises an air intake blower 2, adjoining which there is, in the direction of the air flow, an evaporator 3 and a heater 4. From the heater 4, the air reaches an air-distributing space 5 which branches into a legroom air duct 6, for blowing air into the legroom of the interior 8 of the vehicle, a center plane air duct 7, for blowing air into the central region of the interior 8 of the vehicle, and a defroster air duct 9, which ends in the lower region of the inside of the windshield 10 with essentially upward-blowing defroster nozzles. In each air duct 6, 7, 9 there is an associated air flap 11, 12, 13 which can be selected and with which the air ducts 6, 7, 9 can alternatively be kept open or closed. The air can be taken in by the air intake blower 2 in the conventional manner in a circulating mode of operation over a circulating air intake duct 14 emptying from the legroom region of the interior 8 or, in a fresh air mode of operation, over a supply duct 15, which opens to the outside of the vehicle in the region in front of the windshield 10.

In the supply duct 15, a sensing system 16 is disposed. The sensing system 16 senses the dew point of the outside air and determines the dew point temperature of the outside air that is taken-in. The dew point sensing system can consist in the conventional manner directly of a dew point sensor or of a combination moisture sensor and temperature sensor. The corresponding outside dew point information is supplied by the outside dew point sensing system 16 to a control device 17, which functions as the controlling device for the air-conditioning unit and controls all air conditioning functions. Only the following cooling operation of the air-conditioning unit, which is described in greater detail, is of interest, whereas the unit is operated conventionally by the control device 17 in the remaining modes of operation. For carrying out the characteristic cooling operation, the air-conditioning unit has further means for determining the temperature of the air blown out of the defroster air duct 9, that is, the air temperature in the vicinity of the window pane of the air blown out upwards at an angle over the defroster air duct 9 during the cooling operation of the air-conditioning unit in the direction of the windshield 10. For this purpose, in an alternative embodiment (not shown), a temperature sensor can be provided in the outlet region of the defroster air duct 9. Instead of this, in the unit of FIG. 1, a temperature sensor 18 is provided at the heater 4, which sensor 18 determines the temperature of the heater, which in any case is also required for other operating purposes not of interest here. The signal of this temperature sensor 18 is also supplied to the control device 17, which determines from it the temperature of the air blown over the defroster air duct 9 to the windshield 10 by deducting a correction value from the temperature at the heater 4. The correction value takes into consideration the temperature gradient for the air flowing from the heater 4 to the outlet of the defroster nozzles of the defroster air duct 9 and can initially be determined, empirically. Typical correction values are of the order of 10° K.

The control device 17 controls the operation of the air conditioning unit namely as a function of the output signals of the two sensors 16, 18, which signals are indicated by broken lines in FIG. 1, as well as a function of further sensors, which are not of further interest here and are therefore not shown explicitly. In this connection, especially the automatic energizing of the defroster air flap 13, lying in the defroster air duct 9, by the control unit device 17 over an associated control line 19 is of interest, while the other control lines, which bring about the remaining control functions of the control device 17, are not shown in FIG. 1 for the sake of greater clarity.

The control device 17 controls the cooling operation of the air conditioning unit, during which cooling air is blown into the interior 8, in such a manner that this cooling air is always blown out over the legroom air duct 6 and the central plane air duct 7, as well as, as frequently as possible, also over the defroster air duct 9. In so doing, if the temperature of the air blown out through the defroster nozzle outlets falls below the dew point of the outside air, the danger exists that condensation will develop on the outside of the windshield 10, which could result in an obstruction to vision that cannot be tolerated. The control device 17 therefore prevents cold air from being blown through the defroster air duct 9 in each case to the extent required for reliably preventing condensation on the outside of the windshield 10. For this purpose, a suitable control method, which will be explained below in reference to FIG. 2, is implemented in the control device 17.

Figure 2:
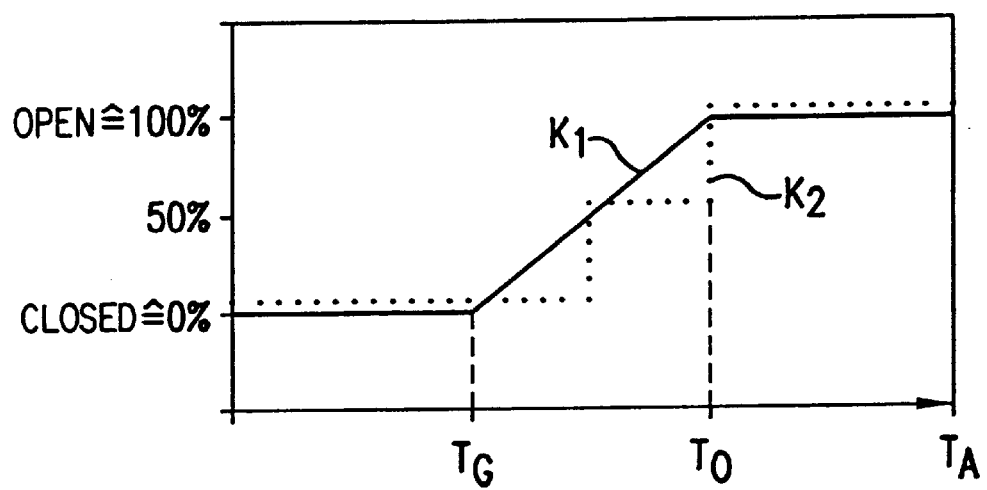
FIG. 2 is a diagram illustrating the changeover region between the closed and open positions of a defroster air duct of FIG. 1.

The diagram of FIG. 2 shows the position of the defroster air flap 13, which is set automatically by the control device 17 during the cooling operation of the air conditioning unit as a function of the temperature $T_A$, determined for the air blown out.

If the temperature $T_A$ is smaller than a threshold value $T_G$ for the closed position, which is determined by adding a safety offset temperature value of, for example, 4° K. to the dew point temperature determined for the outside air, the control device 17 holds the defroster air flap 13 completely closed, because the temperature of the air blown out is then lower than the dew point temperature of the outside air or, at best, only greater by the safety offset value, so that there would be a tendency to form condensation on the outside of the windshield 10 if such cold air were to be blown against the inside of the windshield 10. This is prevented by the automatic closing of the defroster air flap 13.

If the temperature $T_A$ of the air blown out is higher than an open position threshold value $T_O$, the control unit 17 keeps the defroster air flap 13 completely open. In this case, because of the sufficiently warm air blown out, there is no danger of condensation on the outside even at maximum flow against the windshield 10. The threshold value $T_O$ for the open position is higher than the threshold value $T_G$ for the closed position, by a specifiable amount $T_D$ of typically between 5° and 10° K.

The changeover in the position of the defroster air flap 13 between its completely closed and its completely open position takes place within the temperature range between the threshold value $T_G$ for the closed position and the threshold value $T_O$ for the open position. Moreover, the control device 17 can hold the defroster air flap 13 in this region of temperatures $T_A$ of the air blown out in partially open intermediate positions, which can be varied infinitely or in steps depending on the design of the system. In FIG. 2, this is illustrated by 2 examples. In a first example, represented by a continuous line $K_1$ showing the flap position, the defroster air flap 13 is adjusted linearly in this range of temperatures $T_A$ employing degrees of opening, which can be infinitely provided between 0% and 100%, whereas in a second example, in which the flap position is represented by a dotted line $K_2$ the defroster air flap in question is adjusted in steps. In particular, a single, 50% open intermediate position is provided. It is self evident that, if required, further alternatives for energizing the defroster air flap 13 in this range of intermediate positions can be realized, for example, stepped positions with more than one intermediate position, or in the form of a jump-free curved progression of the degree of opening between 0% at the closed position threshold value $T_G$ and 100% at the open position threshold value $T_O$. Of course, a one-step changeover directly between the completely open position and the completely closed position of the air flap at the level of the closed position threshold $T_G$ or at a higher temperature value $T_A$ for the air blown out also come into consideration.

By means of the cooling operation functionality described above, it is possible to blow cooling air with the air-conditioning unit shown as long as possible even through the defroster air duct 9 into the interior 8 without causing condensation to form on the outside of the windshield 10. Blowing cold air also over the defroster air duct 9 has the advantage that the velocities of the air blown through the various air ducts 6, 7, 9 for a given air throughput are less than when the defroster air duct 9 is closed, as a result of which a comparatively draft-free and, with that, an airy climate can be made available within the vehicle. It should be noted here that cold or cooled air in the leg room area is regarded as very unpleasant and that the leg room air duct 6 therefore advisably is closed as soon as the temperature of the air, blown out of the duct, falls below body temperature. Blowing the cooling air only through the center plane air duct 7 would then lead to relatively high unpleasant air velocities which, in the case of the air conditioning unit shown, is avoided in most operating situations of the open defroster air duct 9.

It is self-evident that, aside from the one shown, further realizations of the inventive vehicle air conditioning unit are possible for one skilled in the art. If required, for example, instead of the defroster air duct for the windshield or in addition to this duct, a different air duct leading to a window of the vehicle, such as an air duct which leads to a side window, can also be controlled automatically during the cooling operation of the air conditioning unit in the manner described for the defroster air duct 9 with regard to its air-blowing behavior by the associated air conditioning control device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle air conditioning unit comprising:
   a dew point temperature sensor which determines a dew point temperature of outside air;
   an air duct which leads to a window of the vehicle, said air duct having a controllable closing device;
   a control device which determines the temperature of air blown through the air duct leading to the window, and which automatically opens and closes the air duct by actuating the controllable closing device;
   wherein in a cooling operation of the air conditioning unit, the control device automatically opens and closes the air duct leading to the window as a function of the dew point temperature and temperature of the air blown through the air duct such that the air duct is kept closed as long as the temperature of the air blown through the air duct is lower than the dew point temperature of the outside air plus a specifiable safety offset temperature, and is kept at least partially open as long as the temperature of the air blown through the air duct is above the dew point temperature of the outside air plus the specifiable offset temperature.

2. The air conditioning unit according to claim 1 further wherein the control device in the cooling operation keeps the air duct partially open at blown air temperatures between the dew point temperature plus the safety offset temperature and a temperature value larger than the dew point temperature by a specified amount, a degree of opening of the air duct being variable.

3. The air conditioning unit according to claim 2, wherein the degree of opening is varied in steps between the closed and open positions.

4. A method of operating an air conditioning unit of a vehicle having an air duct leading to a window of the vehicle, said air duct including a controllable closing device, as well as a control unit coupled to the controllable closing device of the air duct, the method comprising the acts of:
   determining a dew point temperature of outside air;
   determining a temperature of air blown through the air duct leading to the window of the vehicle;
   automatically opening and closing the controllable closing device of the air duct in a cooling operation of the air conditioning unit as a function of the dew point temperature and the temperature of the air blown out through the air duct, said automatically opening and closing act keeping the air duct closed as long as the temperature of the air blown out is lower than the dew point temperature plus a defined safety offset temperature value, and keeping the air duct open at least partially as long as the temperature of the air blown out is above the dew point temperature plus the defined safety offset temperature value.

5. The method according to claim 4, wherein the act of automatically opening and closing the air of openings a degree of opening at temperatures of the air blown out through the air duct which are between the dew point temperature of the outside air plus the defined safety offset temperature value and a further temperature value which is larger than the dew point temperature by a defined amount.

6. The method according to claim 5, wherein the act of varying the degree of opening is performed continuously.

7. The method according to claim 5, wherein the act of varying the degree of opening is performed in steps between the opened and closed positions.

* * * * *